United States Patent
Hubner et al.

(10) Patent No.: US 9,432,219 B2
(45) Date of Patent: Aug. 30, 2016

(54) VOICE ENERGY COLLISION BACK-OFF

(75) Inventors: Paul V. Hubner, McKinney, TX (US);
Joseph A. Hilburn, Frisco, TX (US);
Scott J. Hoover, Allen, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 235 days.

(21) Appl. No.: 13/608,311

(22) Filed: Sep. 10, 2012

(65) Prior Publication Data

US 2014/0071978 A1    Mar. 13, 2014

(51) Int. Cl.
*H04L 12/66* (2006.01)
*H04L 12/64* (2006.01)
*H04M 3/00* (2006.01)
*H04M 9/08* (2006.01)
*H04M 3/56* (2006.01)

(52) U.S. Cl.
CPC .......... *H04L 12/6418* (2013.01); *H04M 3/002* (2013.01); *H04M 9/08* (2013.01); *H04M 3/568* (2013.01)

(58) Field of Classification Search
CPC .... H04M 9/082; H04M 3/002; H04M 9/085; H04M 7/006; H04M 7/0084; H04B 3/46–3/48; H04B 3/234; H04L 47/283; H04L 12/6418; H04L 2012/6481; H04L 2012/6491
See application file for complete search history.

(56) References Cited

U.S. PATENT DOCUMENTS

| | | | |
|---|---|---|---|
| 5,937,060 A * | 8/1999 | Oh | 379/406.14 |
| 7,388,946 B1 * | 6/2008 | Mussman et al. | 379/15.01 |
| 2006/0135258 A1 * | 6/2006 | Maheshwari et al. | 463/42 |
| 2009/0046720 A1 * | 2/2009 | Streijl et al. | 370/394 |
| 2010/0135481 A1 * | 6/2010 | Frauenthal et al. | 379/406.06 |
| 2010/0195815 A1 * | 8/2010 | Tada | 379/406.01 |
| 2011/0069830 A1 * | 3/2011 | Chu et al. | 379/406.16 |
| 2011/0205915 A1 * | 8/2011 | Skrabutenas | H04M 3/002 370/252 |
| 2011/0235702 A1 * | 9/2011 | O'Connell | G03B 21/00 375/240.02 |

* cited by examiner

*Primary Examiner* — Khaled Kassim
*Assistant Examiner* — Zhaohui Yang (57) ABSTRACT

A device may perform audio signal collision detection configured to receive first audio information from a first device and receive second audio information from a second device over a communications network. The device may be further configured to identify a collision of the first audio information and the second audio information, and to address the collision by adjusting at least one of an audio attenuation level and a communications latency of the second audio information responsive to identification of the collision, and store the operational parameters to an adjustment profile system.

27 Claims, 6 Drawing Sheets

VOICE ENERGY COLLISION BACK-OFF

BACKGROUND

One-way latency may be defined as an amount of time it takes for information to travel from a source to a destination. Round-trip latency may be defined as an amount of time it takes the information to travel from the source, to the destination, and back to the source. Low latencies over a communications network may be imperceptible to users. Longer latencies may still not be readily perceptible to the users, but may be confusing and disruptive to the flow of information, thereby resulting in interruptions even if the users are not clear why.

DETAILED DESCRIPTION

Communications paths for real-time, two-way information transfers (e.g., conversations) such as cellular telephone calls, satellite conversations, radio links and voice over internet protocol (VoIP) communications, may exhibit varying levels of latency. When two parties hold a conversation over a communications path that exhibits latency, one of the parties may begin communicating when a transmission from the other party is still traveling down the communications path and has not yet been received by the party that is beginning to communicate. The overlap in communications from different directions within the communications path may result in a voice energy collision. The collision may cause the parties to talk over one another, or to "step on" each other's words. This type of latency typically results in both parties retransmitting their words after a brief pause, which may exacerbate the problem by causing further collisions. Collisions typically continue until one party is able to tell the other party to "go ahead." Such collisions can be a frustrating experience for all participants in a real-time, two-way information transfer.

Parties are typically able to handle communications with extremely short delays (i.e., a local conversation) or very long delays with markers ("How are you, over" . . . "Fine, over"). However, latency-induced collisions may be relatively frequent when the communications path latency measures about 150-250 milliseconds or greater, which approximately matches the time a user is typically able to determine the other party has stopped speaking and respond in a local conversation. This range of latency may be especially troublesome for networked communications because the users may not realize that there is a delay. For reference, due to the speed of sound, there is a delay of approximately 20 milliseconds for parties standing one meter apart. Thus, a delayed conversation with latency around ~250 milliseconds is comparable in delay to shouting at someone about 300 feet away.

An end communications device such as a telephone may detect when voice energy from the local party and the incoming network connection begin to collide. By locally inducing an attenuation on the outgoing traffic during a collision, or by adding a delay into one of the two channels (either the incoming network voice or queuing the outgoing voice), collisions may be reduced without the direct knowledge (and therefore frustration) of the parties. In some cases, a communications device may induce attenuation or delay at a remote communications device by way of an in-band or out-of-band communication indicating the presence of a collision.

Alternately, rather than performing the voice collision detection at one or more end devices, a device on the network communications path may detect when voice energy between the parties may cause a collision. The collision detection may be performed in the network path provided a collision detection network device has latency information, such as information regarding the effective network latency between the collision detection network device and the end devices.

The system may include a latency profile of the communications network to facilitate the voice collision detection. The latency profile may include information useful in estimating the latency between the end devices. For instance, the latency profile may include information relating to latencies over network paths on the network, as well as network topology of the communications network indicative of which network paths may be used to carry a communication session between end devices. Using the network topology and path latency information, the latency profile may be used to determine a latency between devices, excluding potentially the latency of the last link portion of the network path to the end devices. This latency determined according to the latency profile may be referred to as a baseline latency. The latency profile may further include information regarding network outages and scheduled maintenance to identify changes in utilized network paths to facilitate the updating of the baseline latency. In some cases, the latency profile may be used to determine the baseline latency for a communications session, without having to determine the particular latencies between the end communications devices over the communications network. In other cases, the baseline latency may be used along with information on the network latency of the end devices to the network to determine an overall amount of network latency between devices.

The communications devices or network collision detection device may collect latency information to facilitate the collision detection performed over the network, and the collected latency information may be incorporated into the latency profile. For example, the communications devices may perform a test to determine an amount of latency between end devices. As another example, a collision detection device on the network communications path may perform a ping test with the endpoint devices to determine the latencies to the collision detection device. As yet another example, the communications devices may perform latency tests during the communications session. Exemplary tests may include a handshake message upon connection, a one-time or periodic ping-type message flow between devices, or a message or messages sent between devices during a pause in conversation. Latency tests may be performed in-band as a test audio signal sent during a quiet portion of the conversation and suppressed by the communications devices to prevent the parties from hearing the test. Or, latency tests may be performed out-of-band by way of a separate connection between the devices, such as a separate data path. In some cases, one-way latencies in both directions may be determined for communications networks in which the latency of communications traveling in one direction differs from the latency of communications traveling in the other direction.

Collected latency information may be used to improve the latency profile and thereby to improve calculation of the baseline latency. Moreover, attenuation or delay settings utilized by the communications devices may also be incorporated into the latency profile to aid other devices in determining how to address detected collisions.

While many examples herein relate to audio communications, it should be noted that the disclosed concepts are applicable to other types of systems having users communicating back and forth in real-time or near real-time over networks with latency issues, where the users regulate the conversation without clear end markers.

Figure 1:
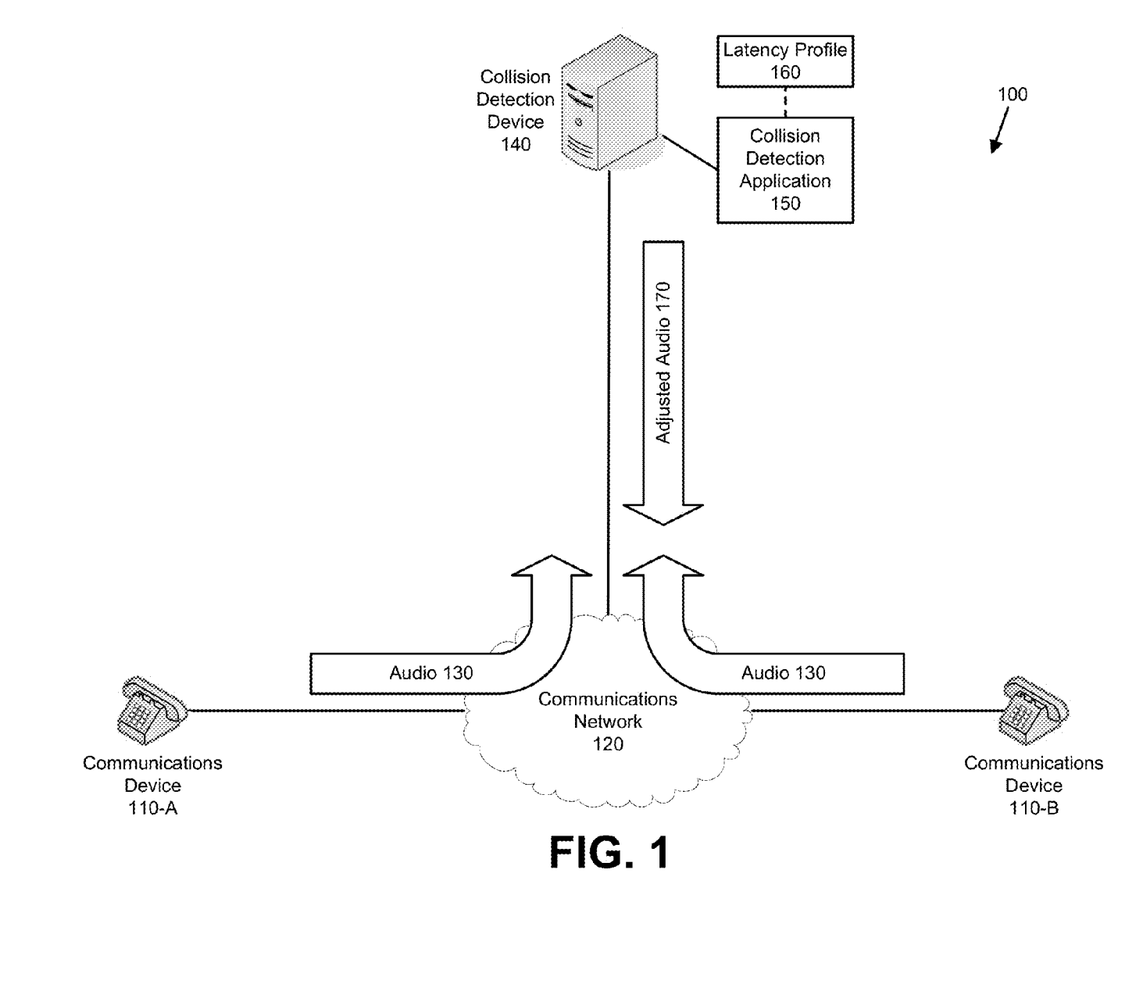
FIG. 1 illustrates an exemplary network implementation of a communications system for reducing voice energy collisions.

FIG. 1 illustrates an exemplary network implementation of a communications system 100 for reducing voice energy collisions. The system 100 may include a communications device 110-A, a communications device 110-B, and a collision detection device 140 in communications with the communications devices 110-A and 110-B over a communications network 120. The collision detection device 140 may be configured to execute a collision detection application 150. The collision detection application 150 may be configured to receive transmitted audio 130 from communications devices 110, such as the communications devices 110-A and 110-B, and to address voice energy collisions by generating adjusted audio 170 from the transmitted audio 130. The collision detection device 140 may generate the adjusted audio 170 according to a latency profile 160. System 100 may take many different forms and include multiple and/or alternate components and facilities. While an exemplary system 100 is shown in FIG. 1, the exemplary components illustrated of the system 100 are not intended to be limiting. Indeed, additional or alternative components and/or implementations may be used.

The communications devices 110-A and 110-B may be devices configured to be suitable to be used by a party to send and receive communications over a communications network 120. Exemplary communications may include audio, video, and data communications. Exemplary communications devices 110 may include plain old telephone system (POTS) telephones, voice over internet protocol (VoIP) phones, mobile telephones, "softphone" software applications, pagers, media content processing systems such as cable set top boxes, and computers such as laptops, desktops, and tablet devices.

The communications network 120 may provide communications services, including packet-switched network services (e.g., Internet access, VoIP communication services) and circuit-switched network services (e.g., public switched telephone network (PSTN) services) to devices such as communications devices 110. Exemplary communications networks 120 may include the PSTN, a VoIP network, a cellular telephone network, a fiber optic network, and a cable television network. To facilitate communications, each communications device 110 on the communications network 120 may have its own unique device identifier be used to indicate, reference, or selectively connect to the identified device on the communications network 120. Exemplary device identifiers may include telephone numbers, mobile device numbers (MDNs), common language location identifier (CLLI) codes, internet protocol (IP) addresses, input strings, and universal resource identifiers (URIs).

When a communications device 110 is connected to another device through a path over the communications network 120 (e.g. communications device 110-A connected to communications device 110-B), the communications devices 110 may send and receive communications such as audio or video with one another. This connection between two or more devices may be referred to as a communications session. In some cases, the sent and received communications may include audio 130 communications. Audio 130 communications may be composed of an audio signal encoded for transmission across the communications network 120. As some examples, the transmitted audio 130 may be encoded and transmitted in an analog or a digital format.

The collision detection device 140 may be used to address voice energy collisions by generating adjusted audio 170 from the transmitted audio 130 according to a latency profile 160. The collision detection device 140 may include a processor configured execute a collision detection application 150, where the collision detection application 150 may be configured to cause the collision detection device 140 to receive transmitted audio 130 from the communications devices 110-A and 110-B, and to identify a collision of the transmitted audio 130 from the communications device 110-A and the transmitted audio 130 from the destination device 110-B.

A collision may be caused when voice energy from one user and voice energy from an incoming network connection begin to be superimposed at one of the endpoints of a communication session. One exemplary situation in which a collision may occur is caused when voice energy is traveling from one user to a second user over a communications network, but due to network latency in combination with human delay in aural perception, the receiving user may be unaware of the traveling voice energy until after he has begun his own transmission. A voice energy collision is a higher-level collision related to properly received data over a network having latency, not a data corruption over an underlying medium of transmission.

If a collision is detected, the collision detection application 150 may be configured to cause the collision detection device 140 to perform one or more adjustments to the transmitted audio 130 to address the collision. These adjustments may cause the collision detection device 140 to generate adjusted audio 170 from the audio 130. The adjusted audio 170 may then be received by a communications device 110 in the place of the originally transmitted audio 130. As shown, the collision detection device 140 may be configured to utilize the collision detection application 150 to generate adjusted audio 170 from audio transmitted by the communications device 110-A to be sent to the communications device 110-B. Thus, the collision detection device 140 may be configured to process transmitted audio 130 from the communications device 110-A into adjusted audio 170 for use by communications device 110-B (a reverse flow not shown in FIG. 1 to maintain clarity).

As some examples of actions that may be performed to the transmitted audio 130 when generating the adjusted audio 170, the collision detection application 150 may be configured to cause the collision detection device 140 to adjust the audio level of the transmitted audio 130 from the communications devices 110, or to increase the communications latency of the transmitted audio 130 from the communications devices 110. The audio level may be adjusted, for example, by applying an attenuation to the audio 130. The level of latency may be adjusted, for example, by adjusting a buffer depth of a buffer configured to store audio 130, with a larger buffer depth causing a correspondingly longer delay. The collision detection application 150 may be further configured to cause the collision detection device 140 to perform multiple of these adjustments to a single instance transmitted audio 130. For example, the collision detection application 150 may cause the collision detection device 140 to perform both an adjustment of audio attenuation and also an increase in latency.

In the case of a communications network 120 utilizing analog audio transmissions, the collision detection application 150 may in some instances be configured to cause the collision detection device 140 to perform analog operations on the audio 130 to generate the adjusted audio 170, such as using an analog amplifier circuit to attenuate the audio 130 or an analog delay to increase latency. In other cases, the collision detection application 150 may in some instances be configured to cause the collision detection device 140 to translate an analog audio signal into a digital audio signal for processing (e.g. via pulse-code modulation or adaptive differential pulse-code modulation techniques), process the audio 130 digitally to generate the adjusted audio 170 (e.g., using digital signal processing techniques to attenuate the audio 130 or digital buffering techniques to increase latency), and then translate any adjusted audio 170 back to an analog signal for further transmission through the communications network 120. In the case of a communications network 120 utilizing digital audio transmissions, the communications network 120 may process the audio 130 digitally to generate the adjusted audio 170, or may convert the audio 130 to analog to generate the adjusted audio 170, and then digitize any adjusted audio 170.

In various exemplary implementations, the collision detection application 150 may cause the collision detection device 140 to process the transmitted audio 130 according to a latency profile 160. The latency profile 160 may include information useful in estimating the latency between devices on the communications network 120, such as the communications devices 110 and the collision detection device 140. For instance, the latency profile 160 may include information relating to latencies over network paths on the communications network 120, as well as network topology of the communications network 120 indicative of which network paths may be used to carry a communication session between devices. The baseline latency may include the network latency of the internal network path, excluding the latency of the last link portion of the network path to the end communications devices 110. The latency profile 160 may further include information regarding network outages and scheduled maintenance to identify changes in utilized network paths to facilitate the updating of the baseline latency. In some cases, the latency profile 160 may be used to determine a baseline latency for a communications session, without having to determine the particular latencies between the end communications devices 110 over the communications network 120. In other cases, the baseline latency may be used along with information on the network latency of the end communications devices 110 to the communications network 120 to determine an overall amount of network latency between the communications devices 110. The latency profile 160 may be updated according to latency information collected by the communications devices 110. For example, the communications devices 110 or the collision detection device 140 may perform tests to determine latency between devices, and may provide the results of these tests for incorporation into the latency provide 160 for future use.

The latency profile 160 may indicate a latency between the collision detection device 140 and various communications devices 110. For instance, a latency profile 160 may indicate a latency between the communications device 110-A and the collision detection device 140 and also a latency between the communications device 110-B and the collision detection device 140. In some cases, the latency profile may include separate latency information for each direction of travel, such as a latency from the communications device 110-A to the collision detection device 140 and also a latency from the collision detection device 140 to the communications device 110-A. In some cases, the latency profile 160 may include latency information determined according to the end devices using ping-type tools and reporting their effective network latencies. In other cases, the latency profile 160 may include latency information determined by the communications network 120.

The latency profile 160 may include information relating to latency of a portion of the communications network 120 to which a communications device 110 is connected. As an example, the latency profile 160 may include information regarding latency of a communications device 110 to a particular cellular tower or Central Office switch to which the communications device 110 is connected. Moreover, the latency profile 160 may be updated based on changes in the connection of the communications device 110. For example, if the communications network 120 identifies that a communications device 110 was handed off from one cellular tower to another tower, the communications network 120 may be configured to update the latency profile 160 to include information regarding the new latency of a communications device 110 to the newly connected cellular tower.

The latency profile 160 may further include information with respect to how to process the transmitted audio 130 into adjusted audio 170 when a voice energy collision is anticipated. For example, the latency profile 160 may indicate one or more of an amount of adjustment of audio attenuation and an amount of adjustment in communications latency to be applied to transmitted audio 130 when generating adjusted audio 170. In some cases, the information such as amounts of adjustment may be settings that may be defined by users of the communications devices 110 or of network administrators of the communications network 120. In some cases, the amounts of adjustment may be set according to historical values of adjustments that have been effective in reducing voice energy collisions in the past. In some examples, the system 100 may accordingly learn appropriate values for the adjustments based on detection and adjustment of previous voice energy collisions.

In some examples the latency profile 160 may be hosted by the collision detection device 140. In other examples, the latency profile 160 may be stored by another device on the communications network 120 or another network. For instance, the communications network 120 may include one or more servers that are configured to host the latency profile 160 information and that are accessible by the collision detection application 150.

In general, computing systems and/or devices, such the communications devices 110 and the collision detection device 140, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the communications devices 110 and the collision detection device 140 generally include computer-executable instructions such as the instructions of the collision detection application 150, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the storage of latency profiles 160, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The collision detection application 150 may be one such computer program product. In some example, the collision detection application 150 may be provided as software that when executed by the processor provides the operations described herein. Alternatively, the collision detection application 150 may be provided as hardware or firmware, or combinations of software, hardware and/or firmware.

Figure 2:
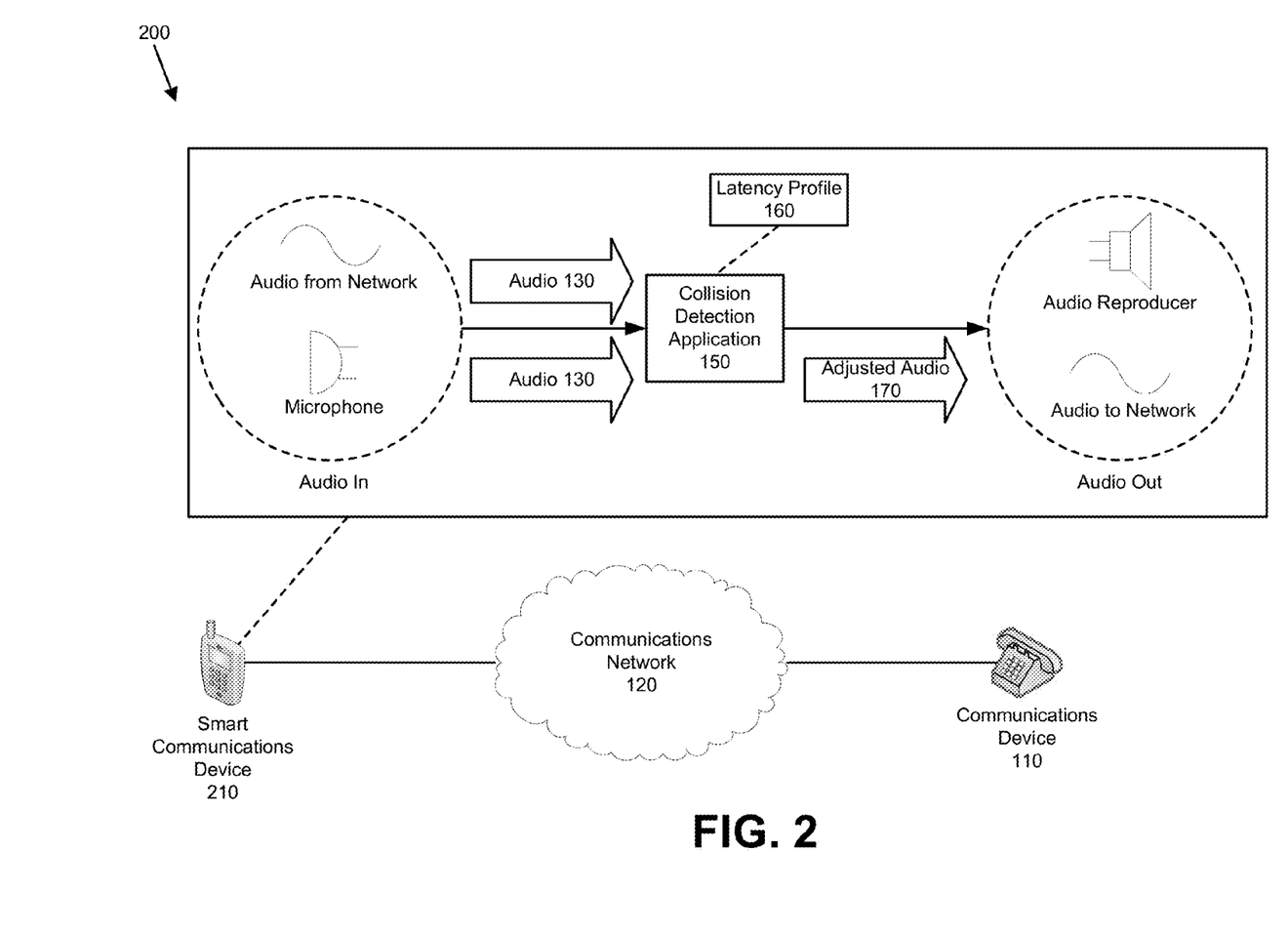
FIG. 2 illustrates an exemplary device implementation of a communications system for reducing voice energy collisions.

FIG. 2 illustrates an exemplary device implementation of a communications system 200 for reducing voice energy collisions. The system 200 may include a smart communications device 210 in communication with a communications device 110 over a communications network 120. The smart communications device 210 (e.g. a cellular phone, a "softphone" telephonic device implemented in software, a wired handset with processing functionality, etc.) may be a type of communication device 110 configured to perform voice energy collision functionality by the smart communications device 210 itself. A smart communications device 210 may operate on the communications network 120 and perform voice energy collision functionality without regard to whether the communications network 120 includes facilities such as the collision detection device 140.

The smart communications device 210 may include a collision detection application 150 configured to perform the collision detection and audio adjustment functionality. The collision detection application 150 may be configured to cause the smart communications device 210 to process transmitted audio 130 into adjusted audio 170, similar to the collision detection application 150 of the collision detection device 140 discussed above with respect to a network implementation of a communications system 100 for reducing voice energy collisions.

The collision detection application 150 may be configured to cause the smart communications device 210 to process transmitted audio 130 received over the communications network 120 or to process transmitted audio 130 received from a user of the smart communications device 210. The smart communications device 210 may further include or have access to latency profile 160 information for use by the collision detection application 150.

Transmitted audio 130 from the communications device 110 received over communications network 120 may be an input source to the collision detection application 150. Local audio 130 may be another input source to the collision detection application 150, such as audio 130 received from a microphone or other acoustic-to-electric energy transducer device. Similar to as discussed above with respect to the collision detection device 140, a latency profile 160 including information regarding the latency between the smart communications device 210 and the communications device 110 may be used by the collision detection application 150 to determine any voice energy collisions. If a collision is detected, the collision detection application 150 may be configured to perform one or more action to the local audio 130 to address the collision, such as to adjust the audio attenuation or latency of the local audio 130, where the adjusted audio 170 generated from local audio 130 may be sent over the communications network 120 to the communications device 110 in the place of the local audio 130. Or, the collision detection application 150 may be configured to perform operations on the audio 130 received over the network responsive to identification of the collision, such as to perform audio attenuation of the received audio 130 to prevent the local user from truncating his transmission. The audio 130, adjusted audio 170, or both may also be reproduced for the user by an audio reproduced of the smart communications device 210, such as a speaker.

As a variation on the device implementation of a communications system 200 for reducing voice energy collisions, in some examples multiple endpoint devices may be implemented as smart communications devices 210. Having multiple smart communications devices 210 running collision detection applications 150 may allow for additional functionality to be used to improve the reduction of voice energy collisions.

As an example of additional functionality that may be available when multiple endpoint devices are smart communications devices 210, the collision detection applications 150 running on each smart communications device 210 may perform tests to determine an amount of latency between the two endpoint smart communications devices 210. These latency tests may be performed in-band as a test audio signal sent during a quiet portion of the conversation and suppressed by the communications devices to prevent the parties from hearing the test audio signal. The latency test may include a payload such as an audio tone or encoded information such as the current time. The latency test may also be performed according to an out-of-band message sent between the smart communications devices 210, such as via a data connection between the endpoint devices over the communications network 120. Or, the latency test may be sent over the network path carrying the conversation, with additional information (such as the time of sending of the latency test) sent out-of-band over another communications path.

As another example of additional functionality that may be available when multiple endpoint devices are smart communications devices 210, the collision detection applications 150 running on each smart communications device 210 may signal to one another to perform remote actions to address voice energy collisions. If a collision is detected by a first collision detection application 150, the first collision detection application 150 may be configured to send a message to a second collision detection application 150 to perform one or more actions to audio 130 local to the second collision detection application 150 to address the collision. The message may be send in-band with the audio or in other cases out-of-band such as via a data connection between the devices executing collision detection applications 150. The message may further include information regarding the action or actions to be performed, such as an indication to the device to attenuate its audio or to increase or decrease its amount of delay. Moreover, adjustments may be performed at multiple ends of the communications session. For instance, a collision detection application 150 may detect a collision, and may perform one or more operations on its local audio 130 and also send a message to another collision detection application 150 to perform one or more action to its corresponding local audio 130 to address the collision.

A network implementation of a communications system for reducing voice energy collisions, such as the system 100 illustrated above with respect to FIG. 1, may be useful in situations in which the end communications devices 110 are unable or otherwise not configured to perform reduction in voice energy collisions. For instance, a network implementation using a collision detection device 140 configured to execute a collision detection application 150 may be suitable for reducing voice energy collisions in a communications session between POTS telephone communications devices 110.

A device implementation of a communications system for reducing voice energy collisions, such as the system 200 illustrated above with respect to FIG. 2 or an exemplary system including multiple smart end communications devices 210, may be useful in situations where one or more end devices are capable of reducing voice energy collisions and may provide greater control and flexibility. For example, because the smart end communications devices 210 may aid in the measuring of the latency, use of smart end communications devices 210 may provide a more accurate estimate of latency as compared to a baseline measure of latency determined according to the latency profile 160. As another example, smart end communications devices 210 may allow for the reduction in voice energy collisions with reduced communications network 120 involvement.

Figure 3:
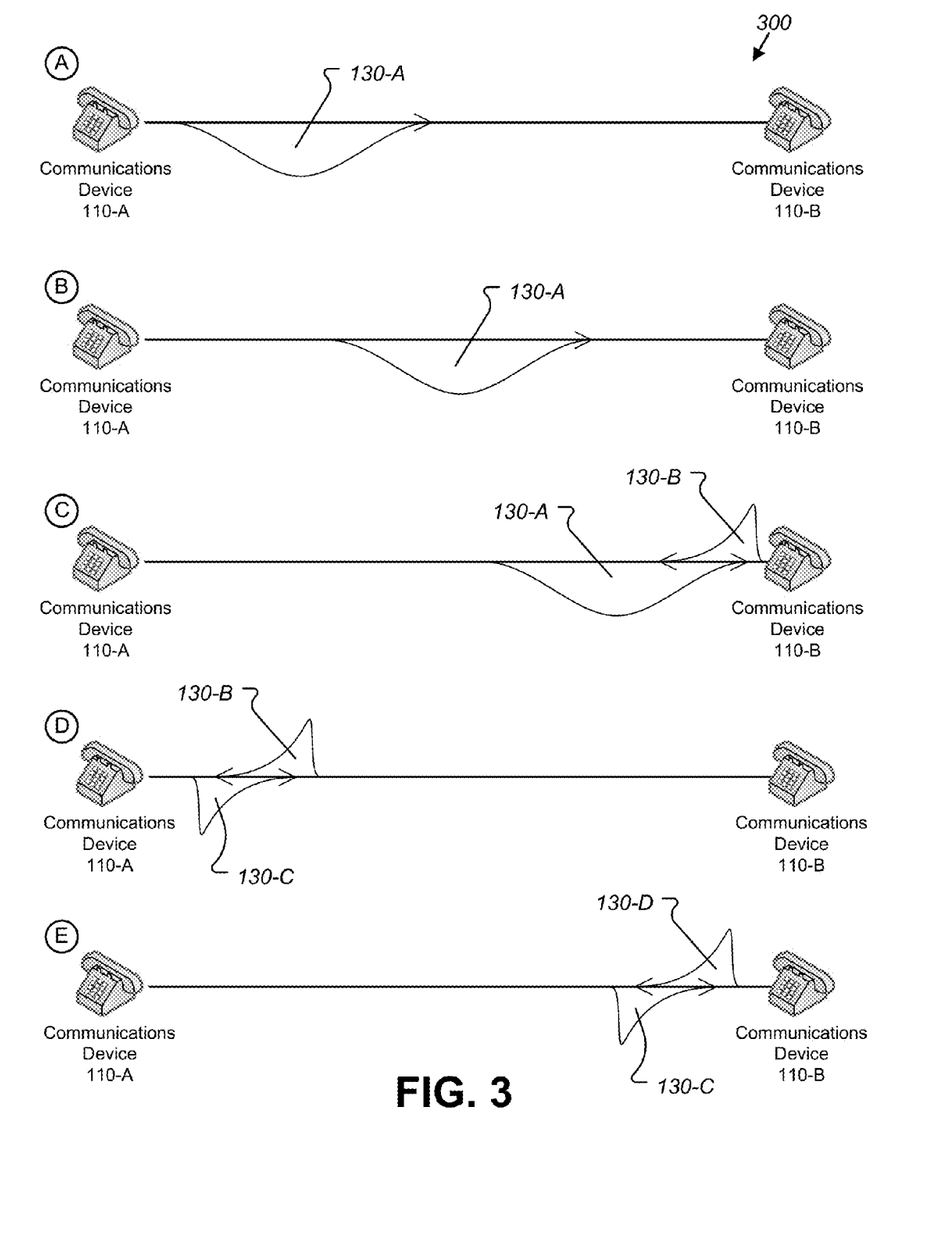
FIG. 3 illustrates an exemplary collision of audio energy occurring between two parties to a communications session.

FIG. 3 illustrates an exemplary collision of audio energy occurring between two parties to a communications session 300. The illustrated communications session 300 may be established between a communications device 110-A and a communications device 110-B, and is shown for five consecutive time indices, labeled index A, index B, index C, index D and index E. It should be recognized that additional elements such as a communications network 120 or optionally a collision detection device 140 would be included in a communications path over which the communications session 300 would travel. Moreover, one or more of communications device 110-A and 110-B may be implemented as smart communications devices 210. However, these elements and details are not shown in FIG. 3 (or FIGS. 4-5) to maintain clarity.

At time index A, as part of a conversation, audio 130-A is sent from the communications device 110-A over the communications network 120 to the communications device 110-B. At time index B, the audio 130-A has traveled only a partial distance from communications device 110-A to communications device 110-B due to network latency. At time index C, the audio 130-A arrives at the communications device 110-B.

Due to the latency in the communications network 120, the user of the communications device 110-B does not expect that the user of communications device 110-A would have been speaking. Thus, having not heard from the user of the communications device 110-A, the user of the communications device 110-B may start to transmit audio 130-B. This transmission of audio 130-B accordingly causes a collision of audio energy between the communications device 110-A and the communications device 110-B.

The user of the communications device 110-A may identify the collision has occurred, and may truncate his transmission (e.g., stop speaking.) At time index D, the truncated audio 130-B may reach the communications device 110-A. The user of the communications device 110-A may begin to hear the truncated audio 130-B while he is speaking, which may cause a further collision with audio 130-C being transmitted from the communications device 110-A. The truncated audio 130-C may then flow back to the communications device 110-B, causing yet another collision at time index E. This cycle of collisions of audio energy between the communications device 110-A and the communications device 110-B may continue for further transmissions of audio 130, resulting in user frustration.

Figure 4:
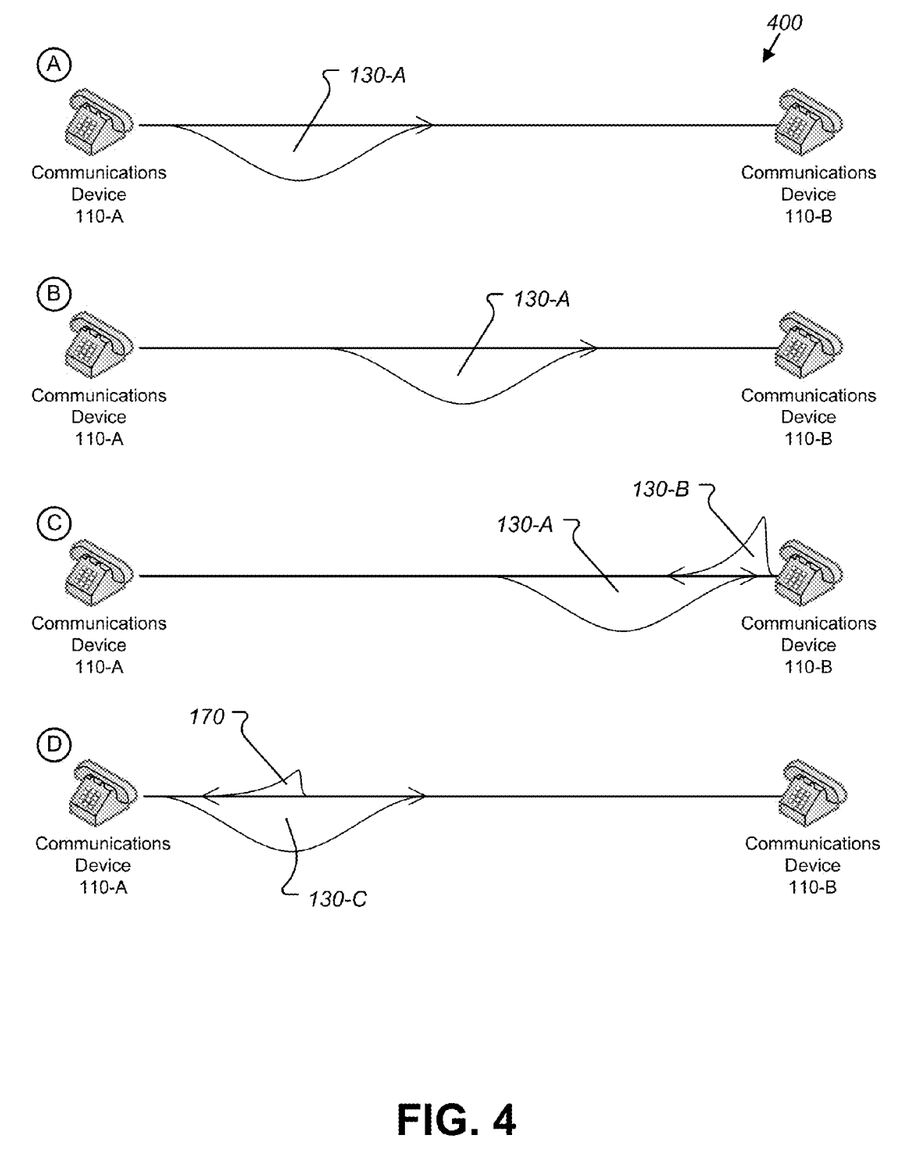
FIG. 4 illustrates an exemplary attenuation adjustment to address a collision of audio energy occurring between two parties to a communications session.

FIG. 4 illustrates an exemplary attenuation adjustment to address a collision of audio energy occurring between two parties to a communications session 400. Similar to the communications session 300, communications session 400 may be established between a communications device 110-A and a communications device 110-B, and is shown for four consecutive time indices, labeled index A, index B, index C and index D.

At time index A, as part of a conversation, audio 130-A is sent from the communications device 110-A over the communications network 120 to the communications device 110-B. At time index B, the audio 130-A has traveled only a partial distance from communications device 110-A to communications device 110-B due to network latency. At time index C, the audio 130-A arrives at the communications device 110-B.

Similar to as discussed above with respect to the communications session 300, in the communications session 400, due to the latency in the communications network 120, the user of the communications device 110-B does not expect that the user of communications device 110-A would have been speaking and may start to transmit audio 130-B. This transmission of audio 130-B accordingly causes a collision of audio energy between the communications device 110-A and the communications device 110-B.

The collision may be identified by a collision detection application 150. In some examples, the collision may be identified, for example, by a collision detection application 150 executed by collision detection device 140 through which the audio 130 between the communications device 110-A and the communications device 110-B is transmitted. In other examples, the collision may be identified by a collision detection application 150 executed by a smart communications device 210 implementation of the communications device 110-A. The determination may be based on a latency profile 160 including information such as a latency of transmission of audio information between the communications device 110-A and the communications device 110-B, or latencies of transmission between each of the communications devices 110-A and 110-B and the collision detection device 140.

Upon detection of the collision, the audio 130-B may be adjusted downward in volume to reduce the effect of the audio 130-B on the user of the communications device 110-A. In other words, the collision detection device 140 or collision detection application 150 may generate adjusted audio 170 from the audio 130-B by applying a level of attenuation to the audio 130-B. When the user of the communications device 110-A receives the adjusted audio 170 at time index D, the adjusted audio 170 may be received at an amplitude reduced to an extent sufficient to cause the adjusted audio 170 to not stop the user of the communications device 110-A from proceeding with audio 130-C. Accordingly, by generating the adjusted audio 170 from the audio 130-B by reducing its amplitude, the cycle of collisions of audio energy between the communications device 110-A and the communications device 110-B may be addressed. As another potential benefit, the user of the communications device 110-B may be more apt to stop speaking upon realizing that the audio 130-B is less audible.

Figure 5:
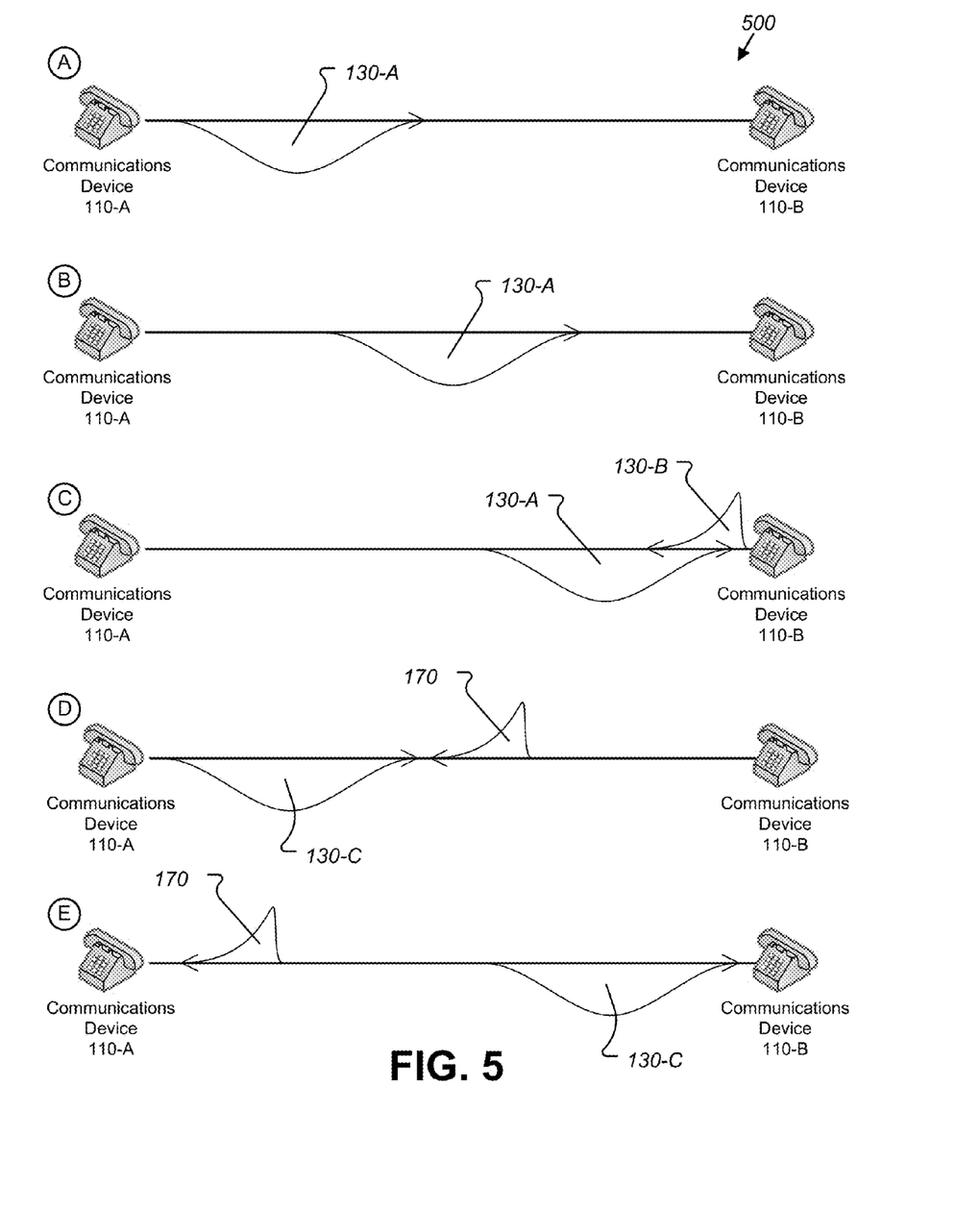
FIG. 5 illustrates an exemplary latency adjustment to address a collision of audio energy occurring between two parties to a communications session.

FIG. 5 illustrates an exemplary latency adjustment to address a collision of audio energy occurring between two parties to a communications session 500. Similar to the communications sessions 300 and 400, communications session 500 may be established between a communications device 110-A and a communications device 110-B, and is shown for five consecutive time indices, labeled index A, index B, index C, index D and index E.

Similar to the communications session 400, audio 130-A may be sent from the communications device 110-A over the communications network 120, which reaches the communications device 110-B at time index C, whereupon the system identifies a collision of audio 130-A with audio 130-B. As illustrated upon detection of the collision, the latency of the audio 130-B is adjusted to be greater to reduce the effect of the audio 130-B on the user of the communications device 110-A. At time index D, rather than the audio 130-B reaching communications device 110-A as illustrated in sessions 300 and 400, the audio 130-B has been delayed such that it does not arrive at the communications device 110-A until time index E. Moreover, because the audio 130-B has been delayed, the audio 130-B no longer causes a collision with the audio 130-C being sent from the communications device 110-A at time index D. Accordingly, by generating the adjusted audio 170 from the audio 130-B by increasing latency, the cycle of collisions of audio energy between the communications device 110-A and the communications device 110-B has been addressed.

Figure 6:
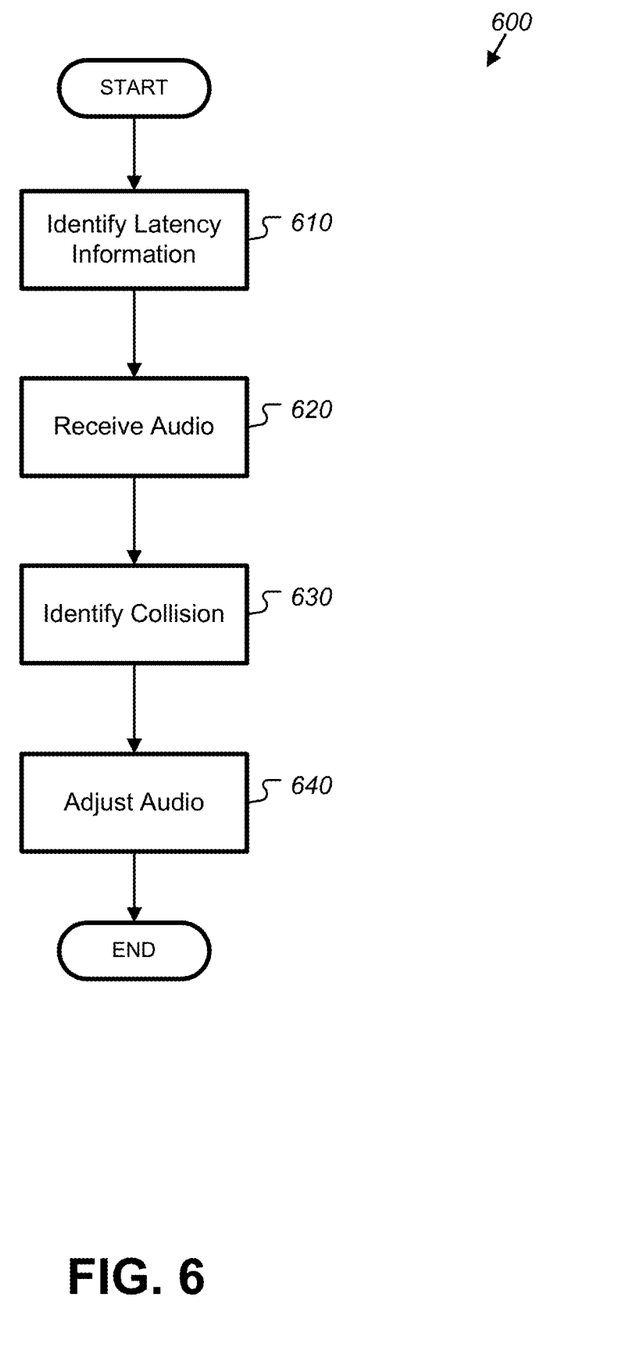
FIG. 6 illustrates an exemplary process for adjusting audio energy to address a collision of audio energy.

FIG. 6 illustrates an exemplary process 600 for adjusting audio energy to address a collision of audio energy. The process 600 may be performed by various devices, such as by a collision detection application 150 executed by a collision detection device 140 in communication with communications devices 110-A and 110-B over a communications network, or by one or more of communications device 110-A and 110-B implemented as smart communications devices 210 executing the collision detection application 150.

In block 610, the collision detection application 150 identifies latency information. For example, the collision detection application 150 may access a latency profile 160 indicating a latency between the collision detection device 140 and various communications devices 110. In some cases, the latency profile 160 may include latency information determined according to the end devices reporting their effective network distances. In other cases, the latency profile 160 may include latency information determined by the communications network 120.

In block 620, the collision detection application 150 receives audio 130. For example, as part of a communications session, audio 130 may be sent from a communications device 110-A over the communications network 120 to another communications device 110-B. As another example, audio 130 may be sent from the communications device 110-B over the communications network 120 to communications device 110-A.

In block 630, the collision detection application 150 identified a collision. In some examples, the collision may be identified, for example, by a collision detection device 140 through which the audio 130 between the communications device 110-A and the communications device 110-B is transmitted. In other examples, the collision may be identified by a collision detection application 150 of a smart communications device 210 implementation of the communications device 110-B. The determination may be based on the latency profile 160 including information such as a latency of transmission of audio information between the communications device 110-A and the communications device 110-B, or latencies of transmission between each of the communications devices 110-A and 110-B and the collision detection device 140.

In block 640, the collision detection application 150 adjusts the audio 130 into adjusted audio 170. For example, upon detection of the collision, the collision detection device 140 or collision detection application 150 may generate adjusted audio 170 from the audio 130 by applying a level of attenuation to the audio 130-B to reduce the effect of the audio 130-B on the user of the communications device 110-A. As another example, upon detection of the collision, the collision detection device 140 or collision detection application 150 may generate adjusted audio 170 from the audio 130 by adjusting upward the latency of the audio 130-B to reduce the effect of the audio 130-B on the user of the communications device 110-A, or do both. As yet a further example, the collision detection application 150 may send a message to another collision detection application 150 to cause the other application to apply a level of attenuation or delay to audio local to the other collision detection application 150.

After block 640, the process 600 ends. Variations on the process 600 are possible. For example, in some cases after block 640 flow may proceed back to block 620 to receive additional audio 130 of a communications session As another example, the process 600 could be altered to utilize levels of collision adjustment. For example, after a predetermined number of collisions have occurred either consecutively or within a period of time, a greater audio attenuation or a greater increase in communications latency may be applied to the audio 130 when generating the adjusted audio 170. Additionally the process 600 could be varied such that if no collision has been detected after a predetermined amount of time, the amount of audio attenuation or communications latency may be scaled back. Accordingly, the process 600 may be used for detecting collisions and also for dynamically varying input/output attenuation and delay to optimize conversation. Since collisions are detectable, collision frequency can be monitored and used to create optimized latency profile 160 information for use over the communications network 120. The optimized latency profile 160 information may further can be carried over to other communications sessions over the communications network, and may be used as starting points for conversation delay or other settings related to the avoidance of voice energy collisions over the communications network 120.

As yet a further example, upon receiving an indication from the network that the latency of a communications device 110 may have changed, the process flow may be directed to block 610 to receive the updated latency information. For example, if the communications network 120 identifies that a communications device 110 was handed off from one cellular tower to another tower, the collision detection device 140 or collision detection application 150 may be configured to refresh the identified latency profile 160 information.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device, comprising:
  a processor; and
  a collision detection application executed by the processor and configured to cause the computing device to:
    receive first audio information generated by a first user of a first device;
    receive, over a communications network, second audio information generated by a second user of a second device;
    identify a collision of the first audio information of the first device and the second audio information of the second device based on a latency profile of end devices of the communication network that is updated according to network outages and scheduled maintenance, the latency profile including information on latencies between the end devices on the communications network and a user-definable setting for a communications latency, wherein the identified collision comprises a voice energy collision that includes an overlap in communications between at least two users and is different than a data collision associated with data corruption at a physical layer of an underlying transmission medium of the communications network; and
    perform an adjustment to the communications latency of the second audio information between a first collision adjustment level and a second collision adjustment level responsive to the identification of a predetermined amount of identified collisions.

2. The device of claim 1, wherein one of the first device and the second device is the computing device, and the other of the first device and the second device is a remote communications device in communication with the computing device over the communications network.

3. The device of claim 2, wherein the latency profile indicates a latency of transmission of audio information between the computing device and the remote computing device.

4. The device of claim 3, where the collision detection application is further configured to perform a test with the remote communications device to determine the latency of transmission of audio information.

5. The device of claim 1, wherein the computing device is in communication with the first device and the second device over the communications network.

6. The device of claim 5, wherein the latency profile indicates a latency of transmission of audio information between the first device and the computing device and a latency of transmission of audio information between the second device and the computing device.

7. The device of claim 5, wherein the latency profile information is determined according to the end devices reporting their effective network latencies.

8. The device of claim 5, wherein the collision avoidance application is further configured to update the latency profile information based on a change in connection of the computing device to the communications network.

9. The device of claim 1, wherein at least one of (i) to adjust communications latency includes to adjust a buffer depth of a buffer configured to store received audio information; and (ii) to adjust audio attenuation level includes to reduce an amount of gain applied to audio information.

10. The device of claim 1, wherein the collision avoidance application is further configured to:
identify a second collision of the first audio information and the second audio information based on the latency profile; and
perform a further adjustment to the communications latency of the second audio information responsive to identification of the second collision.

11. The device of claim 1, wherein the collision avoidance application is further configured to:
identify a lack of a further collision of the first audio information and the second audio information during a predetermined period of time; and
perform a further adjustment to reduce the communications latency of the second audio information responsive to identification of the lack of a further collision.

12. The device of claim 1, wherein the collision avoidance application is further configured to:
determine latencies between the first device and the second device responsive to initiation of a communications session between the first device and the second device;
include the determined latencies in the latency profile;
identify the collision of the first audio information and the second audio information based on the determined latencies included in the latency profile;
identify adjustment information in the latency profile, the adjustment information indicative of at least one of audio attenuation level and communications latency to apply to the second audio information upon identification of the collision;
perform a further adjustment to the communications latency of the second audio information responsive to the identification of the collision based on the identified adjustment information; and
send the adjusted second audio information to at least one of the first device and the second device.

13. A method, comprising:
receiving, by a communications device executing a collision detection application on a processor, first audio information generated by a first user of a first device;
receiving, by the communications device over a communications network, second audio information generated by a second user of a second device;
identifying a collision of the first audio information of the first device and the second audio information of the second device based on a latency profile of end devices of the communication network that is updated according to network outages and scheduled maintenance, the latency profile including information on latencies between the end devices on the communications network and a user-definable setting for a communications latency, wherein the identified collision comprises a voice energy collision that includes an overlap in communications between at least two users and is different than a data collision associated with data corruption at a physical layer of an underlying transmission medium of the communications network; and
performing an adjustment to the communications latency of the second audio information between a first collision adjustment level and a second collision adjustment level-responsive to the identification of the a predetermined amount of identified collisions.

14. The method of claim 13, wherein one of the first device and the second device is the communications device, the other of the first computing device and the second device is a remote communications device in communication with the communications device over the communications network, and the latency profile indicates a latency of transmission of audio information between the communications device and the remote communications device.

15. The method of claim 13, wherein the computing device is in communication with the first device and the second device over the communications network, and the latency profile indicates a latency of transmission of audio information between the first device and the computing device and a latency of transmission of audio information between the second device and the computing device.

16. The method of claim 13, further comprising:
identifying a second collision of the first audio information and the second audio information based on the latency profile; and
performing a further adjustment to the communications latency of the second audio information responsive to identification of the second collision.

17. The method of claim 13, further comprising:
identifying a lack of a further collision of the first audio information and the second audio information during a predetermined period of time; and
performing a further adjustment to reduce the communications latency of the second audio information responsive to identification of the lack of a further collision.

18. The method of claim 13, further comprising at least one of:
performing the adjustment to the communications latency by adjusting a buffer depth of a buffer configured to store the second audio information; and
adjusting an audio attenuation level by reducing a gain level applied to the second audio information.

19. A non-transitory computer readable medium storing a collision detection application software program, the collision detection application being executable to provide operations comprising:
receiving, by a communications device executing a collision detection application on a processor, first audio information generated by a first user of a first device;
receiving, by the communications device over a communications network, second audio information generated by a second user of a second device;
identifying a collision of the first audio information of the first device and the second audio information of the second device based on a latency profile of end devices of the communication network that is updated according to network outages and scheduled maintenance, the latency profile including information on latencies between the end devices on the communications network and a user-definable setting for a communications latency, wherein the identified collision comprises a voice energy collision that includes an overlap in communications between at least two users and is different than a data collision associated with data corruption at a physical layer of an underlying transmission medium of the communications network; and performing an adjustment to the communications latency of the second audio information between a first collision adjustment level and a second collision adjustment level-responsive to the identification of a predetermined amount of identified collisions.

20. The non-transitory computer readable medium of claim 19, wherein one of the first device and the second device is the computing device, and the other of the first device and the second device is a remote communications device in communication with the computing device over the communications network, and the latency profile indicates a latency of transmission of audio information between the computing device and the remote computing device.

21. The non-transitory computer readable medium of claim 19, wherein the computing device is in communication with the first device and the second device over the communications network, and the latency profile indicates a latency of transmission of audio information between the first device and the computing device and a latency of transmission of audio information between the second device and the computing device.

22. The non-transitory computer readable medium of claim 19, further providing for operations comprising:
    identifying a second collision of the first audio information and the second audio information based on the latency profile; and
    performing a further adjustment to the communications latency of the second audio information responsive to identification of the second collision.

23. The non-transitory computer readable medium of claim 19, further providing for operations comprising:
    identifying a lack of a further collision of the first audio information and the second audio information during a predetermined period of time; and
    performing a further adjustment to reduce the communications latency of the second audio information responsive to identification of the lack of a further collision.

24. The non-transitory computer readable medium of claim 19, further providing for operations comprising:
    performing the adjustment to the communications latency by adjusting a buffer depth of a buffer configured to store the second audio information; and
    adjusting an audio attenuation level by reducing a gain level applied to the second audio information.

25. The device of claim 1 wherein:
    the latency profile comprises information for estimating the latencies between the devices on the communications network, including a topology of the communications network indicative of which network paths are usable to carry a communication session between the devices, whereby a baseline latency includes a network latency of an internal network path, but excludes latency of a last link portion of a network path to an end of at least one communications device.

26. The method of claim 13 wherein:
    the latency profile comprises information regarding at least one network outage and scheduled maintenance to identify changes in utilized network paths to facilitate a baseline latency determination, without having to determine at least one latency between an end of at least one communications device over the communications network.

27. The non-transitory computer readable medium of claim 19, wherein at least one of:
    an originally transmitted first audio signal and an adjusted first audio signal corresponding to the first device, or an originally transmitted second audio signal and an adjusted second audio signal corresponding to the second device, is processed for transmission.

* * * * *